United States Patent [19]

Schonholtz et al.

[11] 3,716,848

[45] Feb. 13, 1973

[54] SMALL PORTABLE PAGING RECEIVER WITH AUDIO RECORDING AND REPRODUCING FACILITIES

[75] Inventors: George J. Schonholtz, Rockville; Eugene J. Pawlikowski, Silver Spring, both of Md.

[73] Assignee: said Schonholtz, by said Pawlikowski

[22] Filed: Nov. 23, 1970

[21] Appl. No.: 91,925

[52] U.S. Cl. ..............................340/311, 179/100.11
[51] Int. Cl. ..........................G11b 31/00, H04n 11/02
[58] Field of Search ..................340/311; 179/100.11

[56] References Cited

UNITED STATES PATENTS

| | | | |
|---|---|---|---|
| 3,114,142 | 12/1963 | Bode et al. | 340/311 |
| 3,505,486 | 4/1970 | Lear et al. | 179/100.11 |
| 2,572,157 | 10/1951 | Kay | 179/100.11 |
| 3,536,859 | 10/1970 | Tolar | 179/100.11 |
| 3,037,569 | 6/1962 | Rupp | 179/100.11 |
| 2,983,795 | 5/1961 | Tateishi et al. | 179/100.11 |
| 3,037,094 | 5/1962 | Rush | 179/100.11 |

*Primary Examiner*—Bernard Konick
*Assistant Examiner*—Robert S. Tupper
*Attorney*—Dennison, Dennison, Townshend & Meserole

[57] ABSTRACT

A paging receiver has recorder-playback features compactly arranged in a single and easily transportable unit. A three-position mode selector switch has its brushes arranged to operate, in unison, selectively to positions which permit a means of amplification common to all modes irrespective of the mode selected.

7 Claims, 1 Drawing Figure

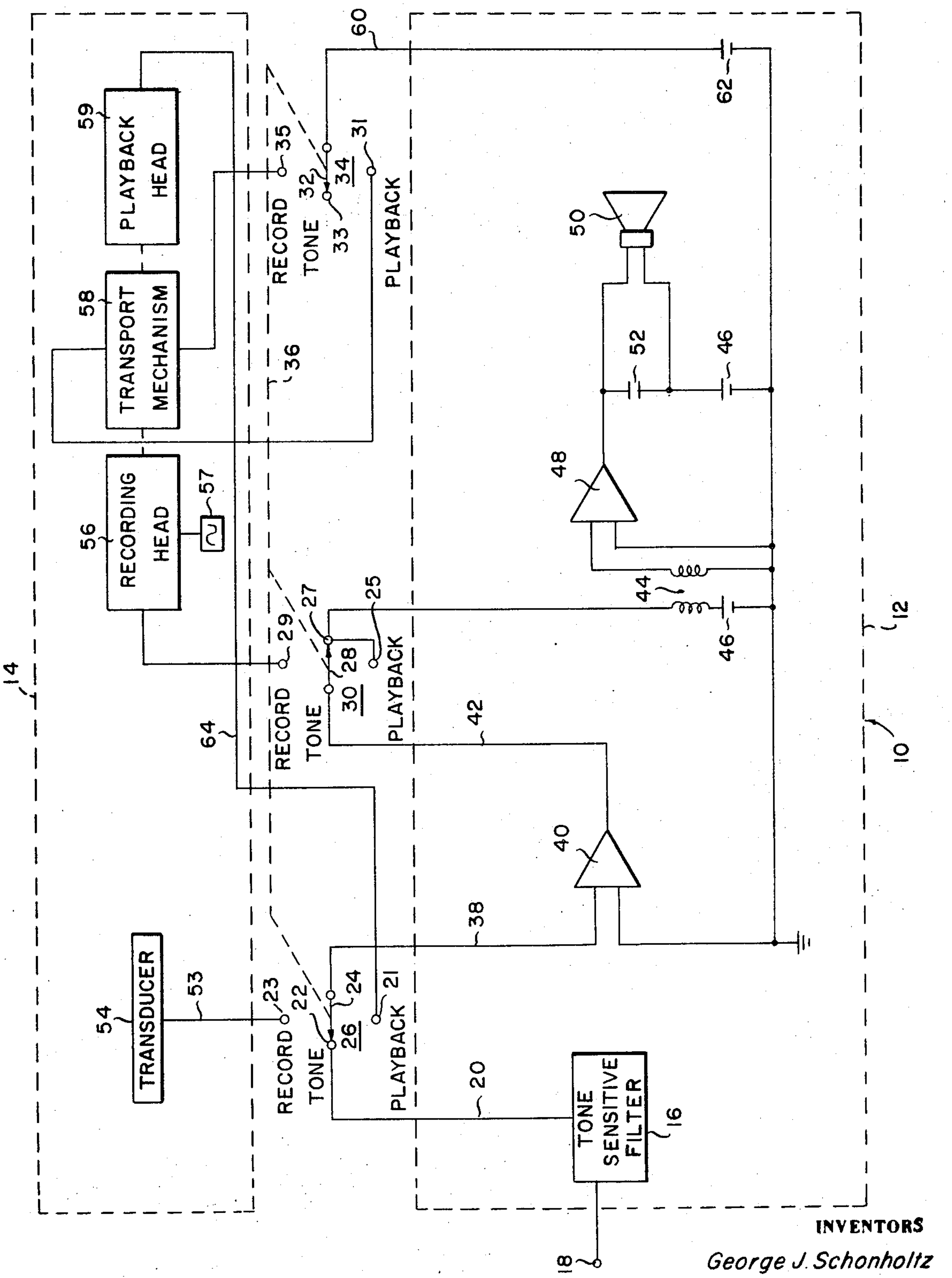
INVENTORS
George J. Schonholtz
Eugene J. Pawlikowski
BY Dennison, Dennison, Townshend & Meserole
ATTORNEYS

SMALL PORTABLE PAGING RECEIVER WITH AUDIO RECORDING AND REPRODUCING FACILITIES

BACKGROUND OF THE INVENTION

1. Field of the Invention

This invention relates generally to receivers of the type which are used in paging systems. More particularly, this invention relates to a paging system of the type which requires operation of a transmitter which issues characteristic signals. These signals are extremely useful to persons whose activities require them to be paged uniquely to the exclusion of all others who have subscribed to a similar paging system. When alerted by either an audio tone or visual signal, the practice most observed is to place a telephone call to a central station to ascertain the reason for the paging signal. The uncertain quality of human recollection imposes a heavy strain on a subscriber who may later regrettably realize that the ensuing conversation cannot be completely and accurately reconstructed. The system of the present invention is particularly suited to the needs of the medical profession although it finds utility in many fields. The usefulness of the present invention thus transcends the limited objectives of paging systems currently in use, for it bridges certain characteristics of the prior art which contribute inefficiently to the orderly conduct of professional service and business affairs. In combining into a single miniature unit the opportunity of first-hand recollection of the elements of a telephone conversation, as well as any mental impressions formed at that time, the present invention uniquely develops for its users an audio index system capable of faithfully reconstructing all conversational content. By replay, the conversation may be recovered instantly; in any event, it is preserved for later use and thus is available for permanent reduction by secretarial transcription. The system also serves as an audio notebook for recording sales information, billing notes, prescription information, etc.

2. Description of the Prior Art

Paging systems of the type known heretofore operate with a plurality of different frequencies for alerting subscribers that some form of contact must be established with a remotely-located party. The principal difficulty with prior art paging receivers is that they only partially solve the problems facing persons whose livelihood or profession requires, on more than an occasional basis, physical separation from those with whom their everyday affairs are conducted. In U.S. Pat. No. 3,114,142, for example, granted Dec. 10, 1963, to H. W. Bode et al, for Selective Paging System, a paging system receiver includes separate enabling circuits energized respectively by successive code groups. The subscriber to the patented system carries a radio receiver which gives an audible signal when an associated radio transmitter broadcasts a predetermined code group. The usual response is to telephone or to return to the office to determine the purpose of the call. In short, such prior art paging systems have been used exclusively for improving or strengthening the audio or visual quality of the signal. Their disadvantage lies in their unimaginative adherence to this sole function.

SUMMARY

This invention resides in the design of a new circuit configuration, the use of a minimum of conventional amplifying and recording components, the employment of a single mode selector switch to vary the specific operating function, a power amplifier circuit committed to multiple function use resulting in savings in terms of economy, power, and space, the elements being incorporated in an economical, easy to manufacture, and portable paging-record-playback receiver characterized by reliability and stability in its performance. When confronted by the highly mobile and industrial society of today, the present invention more than meets the demand. Medical practitioners, for example, are faced with a continuous demand for their services, a situation which often finds them away from their offices or some other central area of responsibility. A recurring dilemma is to be called upon to render medical advice at a distance, and generally by telephone, in circumstances which make it inconvenient if not impossible to prepare a memorandum of the diagnosis made or advice given before too much time has elapsed. Commercial activities such as encountered in the field of sales, service agencies, and repair facilities are other examples when frequent transmission of paging signals solely for the purpose of soliciting a prompt telephone reply can be expected. In so far as meticulous clarity and exactness in reporting a conversational exchange represents a problem in professional or commercial affairs, the present invention obviates the need to trust to memory what transpires in response to a paging signal.

Accordingly, an object of the invention is to provide a paging receiver and audio recorder-playback combined in a single unit occupying a minimum amount of space.

Another object of the invention is to provide, in a unitary structure, an audio signaling and voice recording circuit quickly and efficiently operable to one of several cardinal functional positions.

A further object of the invention is the ability to provide, for everyday use, a system which stores messages and notes of exact reproducible quality.

Another object of the invention is to effect economy in the use of component parts, by virtue of utilizing elements related functionally to a common amplifier circuit.

BRIEF DESCRIPTION OF THE DRAWING

The drawing is a diagram, partly in block form, showing the invention. A complete understanding of the invention and an introduction to other objects and features not specifically mentioned may be had from the following detailed description of an exemplified embodiment thereof.

DESCRIPTION OF THE PREFERRED EMBODIMENT

Referring now to the drawing, the invention circuit, which is designated as a whole by the reference character 10, comprises selective paging receiver portion 12 and a portion, designated by the reference character 14, which constitutes the apparatus wherein recorded messages are stored until such time as they are required for reproduction. The portion 12 of the invention embodiment is comprised of a tone sensitive filter 16 tuned to a particular frequency range to which the receiver is to respond. The energization of the filter 16 by the presence of a pulse at terminal 18 is in accordance with the operation of a paging receiver such as, for example, disclosed in U.S. Pat. No. 3,114,142, and thus does not constitute a part of this invention. Therefore, it is sufficient for the purpose of the invention to understand that as a distinctive signal is generated by a remote signal tone generator (not shown), a unique code recognition signal is developed by filter 16 which indicates to the person subscribing to the paging system that a remotely-located party is asking to be reached, that is, to establish voice communication.

The distinctive signal transmitted by filter 16 is passed over line 20 to fixed terminal 22 of a first bank 26 of selector switches 26, 30 and 34, three in number, each of which comprises a bank of three fixed terminals, and a contact brush. The contact brushes are designated by the reference numerals 24, 28 and 32. Each of the selector switch brushes is of conductive material and is rotatably mounted at its central point. Each of the banks of terminals preferably is arranged in a semi-circle, so that the brush may engage any one of the terminals in a bank during rotation thereof. The three brushes 24, 28 and 32 are mounted on a common shaft 36 to operate in unison, and are insulated from each other.

Referring to the brushes 24 and 28, the brush 24 is connected by wire 38 to a first amplifier 40 having an output lead 42 in turn electrically connected by brush 28 to fixed terminal 27. The terminal 27 of the bank 30 is connected to an isolating transformer 44 the primary winding of which is connected to ground through a battery 46. The output from transformer 44 is coupled to an amplifier 48 which, in turn, is arranged to energize a speaker 50 located in the output circuit of amplifier 48. Condenser 52 across the input terminals of speaker 50 serves to match the output impedance of amplifier 48 to the impedance of speaker 50.

The selective paging receiver portion 12 thus far under consideration is responsive to a distinctive tone passed through filter 16, this signal being sent through brush 24 of the first bank 26 of the mode selector switch, boosted by amplifier 40, and being sent through brush 28 and fixed terminal 27 of the second bank 30 to amplifier 48 and speaker 50. The audible signal tone indicates to the person carrying the receiver embodying the present invention that an effort should be made to investigate the reason for the call.

RECORDING MODE

Referring now to the first bank 26 of the mode selector switch, terminal 23 is connected by wire 53 to a transducer 54 which may be a microphone of the type well known in the art for converting variable pressure speech vibrations into electrical currents suitable for voice recording. Upon connection of brush 24 to terminal 23, the mode selector switch disconnects the tone sensitive filter 16 from the audible tone registering system and arranges for the presentation of voice frequency signals produced by the subscriber. Simultaneous with the movement of brush 24 into connection with terminal 23, brush 28 moves into connection with fixed terminal 29, and brush 32 establishes connection with fixed terminal 35. Viewing the second bank alone, terminal 29 is connected to a recording head 56 of the type well known in the art. Bias current is fed by 57 into the recording head for the two purposes of increasing the amount of signal which is on the tape and for reducing distortion for a given level of recorded signal. A transport mechanism 58 moves the tape past the recording head 56 at a rate which is both uniform and accurate. A playback head 59 operably associated with transport mechanism 58 serves the purpose of recovering the recorded information, as is well known in the art. The recording medium, of course, is moved at the required speed as a result of being pinched between a motor-driven capstan and spring-actuated rubber roller (not shown). The transport mechanism 58 may also embody several other features, not essential to the understanding of the invention, such as, for example, restraining torques on the tape-spool spindles, appropriate brakes, guide rolls, pressure pads, etc.

Referring now to the bank 34 of the mode selector switch, the fixed terminal 35 is connected to one input of transport mechanism 58, whereas the other input is brought back to terminal 31 of bank 34. A conductor 60 connects the brush 32 to one terminal of a source of unidirectional voltage such as, for example, a battery 62 whose other terminal is connected to ground. The output of playback head 59 is connected by conductor 64 to terminal 21 of the first bank of the mode selector switch. The position of the brush 32 as shown in connection with terminal 33, has, of course, no functional significance in the TONE mode. It will be understood, however, that when by shaft 36 brush 32 is made to contact terminal 35, the apparatus embodying the invention is placed in the RECORD mode. Since transducer 54 will feed through contact 23–24 of bank 26, amplifier 40, and contact 28–29 of bank 30, this same signal will be fed into recording head 56, the transport mechanism 58 being operated in the RECORD direction, whereby the voice content will be stored until such time or times as it is required for reproduction.

It thus will be understood that having stored the message, or a summarized result thereof, the subscriber may now return to his activities, reassured by the knowledge that the object of his conversation is now stored efficiently for later reproduction by his secretary to form a permanent part of his professional or business records. It generally may be assumed, moreover, with the conversational exchange now safely preserved, that the subscriber will advance the brushes of the mode selector switch to the TONE position, as shown in the drawings, to place the circuit in the receiving mode and thus await the receipt of the next paging signal.

PLAYBACK MODE

After the subscriber has recorded what to him represents the important elements of the conversation in response to a paging signal, it becomes readily apparent that the stored messages are now available for playback through speaker 50 by operating transport mechanism 58 in reverse. Referring to the bank 26, with the brushes advanced to the PLAYBACK mode, the brush 24 of bank 26 establishes contact with terminal 21; brush 28 of bank 30 is advanced to terminal 25; and brush 32 of bank 34 is brought into engagement with terminal 31. Under such conditions, the output of playback head 59 is conducted over line 64 and contact 21–24 of bank 26, to speaker 50 over a circuit which may be traced over the following path: line 64, contact 21–24 of bank 26, line 38, amplifier 40, line 42, contact 25–28 of bank 30, transformer 44, and through amplifier 48 to speaker 50. At bank 34, the brush 32 engages terminal 31 by which the polarity of the voltage supplied to transport mechanism is reversed. It follows, therefore, that in the PLAYBACK mode the voltage to transport mechanism 58 is reversed in polarity so that it is driven in a direction opposite to the movement which occurs during the RECORD mode. The resulting movement of transport mechanism 58 activates playback head 59 whereupon, over the path hereinabove described, the recorded material becomes available at speaker 50 completely satisfactory as to the content of the speaker's voice.

It will be appreciated that a subscriber in response to a paging signal may selectively advance the apparatus to the RECORD mode simultaneously with making a telephone reply in response to being paged, the immediate object being gained of recording in reproducible form that part of the conversation directly attributable to him, so that the exact words are recorded. It will also be observed that the amplifier section comprising amplifiers 40 and 48 serves in a most adequate manner in carrying out the amplification required, irrespective of the mode selected, thereby ensuring economy in the use of components and miniaturization to the greatest possible extent.

Although we have herein shown and described only one form of apparatus embodying our invention, it is to be understood that various changes and modifications may be made therein without departing from the spirit and scope of the claims.

We claim:

1. Compact and portable signal responsive paging and voice reproduction audio notebook apparatus of a size adapted to be held in the hand having easily selectable paging, recording and reproducing modes comprising:

filter means responsive to a plurality of predetermined code groups for developing a unique audibly heard code recognition signal indicative of a remotely-generated request to enter into conversation;

amplifying means effecting economy in power and space for producing said audibly heard audio output signal;

hand held and manually manipulable transducer means for converting variable pressure speech characteristics into electrical current variations suitable for voice recording:

voice frequency signal recording and reproducing means including recording and reproducing output terminals, and further including reversibly operable transport means having first and second input terminals;

and variable switching means integrally associated with said filter means, said amplifying means, said transducer means and said voice frequency signal recording and reproducing means in a portable, single unit occupying a minimum amount of space having plural sections, said switching means operable for selectively connecting said amplifying means in common to said filter means whereby paging signals to which said filter means responds are amplified by said amplifying means, to said transducer means and said recording input terminal whereby speech tones generated by said transducer means are applied to said recording terminal of said voice signal recording and reproducing means following amplification by said amplifying means, and to said reproducing output terminal whereby signals recorded by said voice frequency signal recording and reproducing means are applied to said amplifying means for amplification in the paging, recording and reproducing modes, respectively.

2. The apparatus as set forth in claim 1 wherein said transducer means is a microphone.

3. The apparatus as set forth in claim 1 wherein a recording head is connected to said recording input terminal, and a playback head is the source of voice signals applied to said reproducing output terminal.

4. The apparatus as set forth in claim 1 wherein said amplifying means includes at least two stages of audio amplification in said paging and reproducing modes.

5. A compact and portable paging communications receiver including internally available audio notebook voice recording and reproducing facilities, said receiver being hand held in operation and comprising:

filter means responsive to a plurality of predetermined code groups for developing a unique audibly reproduced code recognition signal;

amplifying means effecting economy in power and space for producing said audibly heard audio output signal;

hand held and manually operable transducer means for converting variable pressure speech characteristics into electrical current variations suitable for voice recording;

dual purpose voice storage and retrieval means including heads for recording and playback and transport means operable in both the record and playback mode in dependence on the polarity of the transport driving voltage;

variable switching means integrally associated with said filter means, said amplifying means, said transducer means, and said voice storage and retrieval means in a portable single unit occupying a minimum amount of space for selecting one of the three operating modes of paging, recording, and playback;

said switching means including three banks of selector switches, each of which comprises a plurality of fixed terminals, and a movable element operable into engagement therewith under the control of a single control lever; said movable elements being operable in unison to a first position for enabling said filter means to feed said amplifying means, simultaneously disabling said transducer means, said recording and playback heads, and said transport means, to a second position enabling said transducer means to feed said recording head through said amplifying means, simultaneously enabling said transport means in a voice-recording direction and disabling said filter means and said playback head, and to a third position for enabling said playback head to feed said amplifying means, simultaneously enabling said transport means in a voice reproducing direction and disabling said transducer means, said recording head, and said filter means.

6. The receiver as set forth in claim 5 wherein said transducer means is a microphone.

7. The receiver as set forth in claim 5 wherein the fixed terminals of said banks of said selector switches produce the flow of audio currents through at least two stages of said amplifying means upon receipt of paging signals and upon playback of the voice recorded message.

* * * * *